US011968985B2

United States Patent
Yuasa et al.

(10) Patent No.: US 11,968,985 B2
(45) Date of Patent: Apr. 30, 2024

(54) WRAP OFF-CUTS RETURNING MECHANISM IN GYOZA FORMING MACHINE

(71) Applicant: Tosei Kogyo Co., Ltd, Tokyo (JP)

(72) Inventors: Toyono Yuasa, Tokyo (JP); Yoshie Yuasa, Tokyo (JP); Masahito Murakami, Tokyo (JP)

(73) Assignee: TOSEI KOGYO CO., LTD., Tokyo (JP)

( * ) Notice: Subject to any disclaimer, the term of this patent is extended or adjusted under 35 U.S.C. 154(b) by 638 days.

(21) Appl. No.: 17/237,463

(22) Filed: Apr. 22, 2021

(65) Prior Publication Data

US 2022/0202024 A1 Jun. 30, 2022

(30) Foreign Application Priority Data

Dec. 28, 2020 (JP) ................... 2020-219065

(51) Int. Cl.
*A21C 9/06* (2006.01)
(52) U.S. Cl.
CPC .................. *A21C 9/063* (2013.01)
(58) Field of Classification Search
CPC ..................................... A21C 9/063
USPC ...................................... 99/450.6
See application file for complete search history.

(56) References Cited

U.S. PATENT DOCUMENTS

| 4,515,819 A * | 5/1985 | Shinriki | A21C 9/063 426/94 |
| 5,733,583 A * | 3/1998 | Muller | A21C 3/04 426/503 |
| 6,321,642 B1 * | 11/2001 | Ou-Young | A23P 20/25 99/450.6 |
| 6,892,630 B1 * | 5/2005 | Huang | A23P 30/25 99/450.6 |

(Continued)

FOREIGN PATENT DOCUMENTS

| CN | 207136076 U | 3/2018 |
| CN | 109402868 A | 3/2019 |

(Continued)

OTHER PUBLICATIONS

First Office Action of corresponding Chinese Patent Appln. No. 202110449382.6 issued on Aug. 19, 2022.

*Primary Examiner* — Sean M Michalski
(74) *Attorney, Agent, or Firm* — BACON&THOMAS, PLLC

(57) ABSTRACT

In a gyoza forming machine compressing a half kneaded noodle skin material to form into a belt-like noodle skin, die cutting the obtained belt-like noodle skin into a predetermined shape to form a gyoza skin, putting a gyoza filling on the gyoza skin, and wrapping the gyoza filling with the gyoza skin to obtain a gyoza, the gyoza forming machine includes a wrap off-cuts returning mechanism having a supply unit for a wrap off-cuts and the half kneaded noodle skin material arranging the half kneaded noodle skin material on both surfaces of the die cut wrap off-cuts, and a (Continued)

noodle skin forming unit compressing the wrap off-cuts and the needle skin material supplied from the supply unit to form a three-layer structure needle skin, and the wrap off-cuts returning mechanism is configured to return the die cut wrap off-cuts formed by the noodle skin forming unit to the supply unit.

27 Claims, 12 Drawing Sheets

(56) References Cited

U.S. PATENT DOCUMENTS

| | | | |
|---|---|---|---|
| 8,505,445 B2 * | 8/2013 | Robert | A21C 9/063 426/138 |
| 2005/0072318 A1 | 4/2005 | Ou-Young | |
| 2010/0151093 A1 * | 6/2010 | Wilk | A21C 9/088 99/450.6 |
| 2011/0062621 A1 * | 3/2011 | Kobayashi | A21C 11/103 425/287 |
| 2018/0064118 A1 * | 3/2018 | Bolla | A21C 11/10 |

FOREIGN PATENT DOCUMENTS

| | | |
|---|---|---|
| CN | 110353003 A | 10/2019 |
| CN | 209489388 U | 10/2019 |
| CN | 209965090 U | 1/2020 |
| CN | 211211191 U | 8/2020 |
| CN | 216292804 U | 4/2022 |
| JP | 2009296962 A | 12/2009 |
| JP | 20191656994 B2 | 10/2019 |
| TW | 201940081 A | 10/2019 |

* cited by examiner

WRAP OFF-CUTS RETURNING MECHANISM IN GYOZA FORMING MACHINE

TECHNICAL FIELD

The present invention relates to a wrap off-cuts returning mechanism in a gyoza forming machine, and more particularly to a wrap off-cuts returning mechanism in a gyoza forming machine for reusing the wrap off-cuts after die cutting a noodle skin for a gyoza skin.

BACKGROUND ART

In the past, as disclosed in patent literature 1, there exists a gyoza making apparatus including an input unit which can input a half kneaded material, a belt-like forming unit which compresses the half kneaded material input to the input unit and forms into a belt-like shape, a die cutting unit which can die cut the belt-like material obtained in the belt-like forming unit into a predetermined shape and obtain a gyoza skin, a gyoza forming unit which puts a gyoza filling on the gyoza skin obtained in the die cutting unit and obtains a gyoza by wrapping the gyoza filling with the gyoza skin, and a carry-in unit which carries the wrap off-cuts after die cut by the die cutting unit in the belt-like forming unit.

The belt-like forming unit of the patent literature 1 is configured to be capable of forming a belt-like material having a first layer which is formed in one surface side and is formed by the half kneaded material input to the input unit, and a second layer which is formed in the other surface side and is formed by the remaining material carried in the belt-like forming unit by the carry-in unit.

CITATION LIST

Patent Literature

Patent Literature 1: Japanese Patent No. 6727566

SUMMARY OF INVENTION

Technical Problem

However, in the patent literature 1, a production cost can be reduced by reusing the remaining material, but the second layer formed by the remaining material is inside the skin on which the gyoza filling is put. As a result, the second layer is less flexible in comparison with the skin of the first layer, and there is a risk that the texture will deteriorate. More specifically, since moisture of the reused remaining material is different from moisture of the newly input half kneaded material, the portion obtained by the remaining material is different in hardness from the portion obtained by the half kneaded new material in a case where the remaining material die cut by the die cutting unit is reused as the gyoza skin. As a result, the quality varies and there is a problem that the texture and taste deteriorate.

The present invention is made by taking into consideration the conventionally existing circumstances as mentioned above, and an object of the present invention is to provide a wrap off-cuts returning mechanism in a gyoza forming machine which can reduce a production cost by reusing a remaining material and can obtain a three-layer structure gyoza skin which can suppress deterioration of texture and taste due to the remaining material and maintain a quality with no variation.

Solution to Problem

In order to achieve the object mentioned above, according to the present invention, there is provided a gyoza forming machine compressing a half kneaded noodle skin raw material to form into a belt-like shape, die cutting the obtained belt-like material into a predetermined shape to form a gyoza skin, putting a gyoza filling on the gyoza skin, and wrapping the gyoza filling with the gyoza skin to obtain a gyoza, wherein the gyoza forming machine comprises a supply unit for a wrap off-cuts and the half kneaded noodle skin raw material which arranges the half kneaded noodle skin raw material on both surfaces of the wrap off-cuts after being die cut, and a noodle skin forming unit which compresses the wrap off-cuts and the needle skin raw material supplied from the supply unit to form a three-layer structure needle skin, and wherein the gyoza forming machine is configured to return the die cut wrap off-cuts formed by the noodle skin forming unit to the supply unit.

The supply unit includes a hopper which inputs the half kneaded noodle skin raw material, and a feeding conveyor which feeds the noodle skin raw material and the wrap off-cuts to the noodle skin forming unit below the hopper.

The supply unit includes a hopper and a feeding conveyor which are configured to supply the half kneaded noodle skin raw material to an upper surface of the feeding conveyor in a front side within the hopper, thereafter supply the wrap off-cuts so as to position in an upper side of the half kneaded noodle skin raw material, and supply the half kneaded noodle skin raw material to a lower side of the wrap off-cuts in the upper surface of the feeding conveyor in a rear side within the hopper.

The hopper is formed by a rectangular frame which has a rectangular shape having an anteroposterior length in a plan view with using a front plate, a rear plate, and a pair of two side plates, and is vertically open, and has below the front plate a passing hole for the half kneaded noodle skin raw material and the wrap off-cuts which are put on the feeding conveyor in the lower side within the hopper.

A tray for inputting the half kneaded noodle skin raw material to an upper surface of the feeding conveyor in the lower side within the hopper is disposed in an upper portion of a side plate in front of the hopper.

An upper surface of the tray is provided with a partition plate configured to input the half kneaded noodle skin raw material to a front side and a rear side of the feeding conveyor in the lower side within the hopper.

The noodle skin forming unit in front of the supply unit is formed by a rolling machine fixed to a shaft in which a rotating disc axially supporting a plurality of beat rollers so as to be rotatable on the same circumference is pivotally attached to a support frame.

The needle skin forming unit in front of the supply unit is formed by a rolling machine fixed to a shaft in which a pipe roller is pivotally attached to a support frame rotatably.

A stepped pressing plate is axially supported to be swingable in front of the rolling machine.

Effect of Invention

According to the present invention, the production cost can be reduced by reusing the wrap off-cuts corresponding to the remaining material, and the quality of the gyoza skin can be maintained by suppressing the reduction in the texture and the taste caused by the wrap off-cuts.

More specifically, in the gyoza forming machine compressing the half kneaded noodle skin raw material to form into the belt-like shape, die cutting the obtained belt-like material into the predetermined shape to form the gyoza skin, putting the gyoza filling on the gyoza skin, and wrapping the gyoza filling with the gyoza skin to obtain the gyoza, the gyoza forming machine comprises the supply unit for the wrap off-cuts and the half kneaded noodle skin raw material which arranges the half kneaded noodle skin raw material on both surfaces of the wrap off-cuts after being die cut, and the noodle skin forming unit which compresses the wrap off-cuts and the needle skin raw material supplied from the supply unit to form the three-layer structure needle skin, and the gyoza forming machine is configured to return the die cut wrap off-cuts formed by the noodle skin forming unit to the supply unit. Therefore, it is possible to prevent the texture and the taste from being lowered by the difference in hardness between both surfaces of the gyoza skin having two-layer structure, on the basis of the three-layer structure.

More specifically, the die cut wrap off-cuts once used as the gyoza skin dough becomes hard in comparison with a new gyoza skin formed by the half kneaded noodle skin raw material. As a result, a variation is generated in quality between both the doughs, and the taste and the texture is lowered due to the lack of flexibility. However, in a case where the three-layer structure is formed by arranging the wrap off-cuts after being die cut in the middle and sandwiching the wrap off-cuts between new gyoza skins according to the present invention, the wrap off-cuts after being die cut can be reused, and the production cost can be reduced. Further, the texture and the taste do not change when eating whichever surface of the gyoza skin is set to an inner side which is in contact with the filling, so that the gyoza skin having a stable quality can be obtained.

The supply unit is provided with the hopper which inputs the half kneaded noodle skin raw material, and the feeding conveyor which feeds the noodle skin raw material and the wrap off-cuts to the noodle skin forming unit below the hopper. Therefore, it is possible to smoothly supply the half kneaded noodle skin raw material and the wrap off-cuts to the noodle skin forming unit in the next step.

The supply unit is provided with the hopper and the feeding conveyor which are configured to supply the half kneaded noodle skin raw material to the upper surface of the feeding conveyor in the front side within the hopper, thereafter supply the wrap off-cuts so as to position in the upper side of the half kneaded noodle skin raw material, and supply the half kneaded noodle skin raw material to the lower side of the wrap off-cuts in the upper surface of the feeding conveyor in a rear side within the hopper. Therefore, it is possible to easily and securely supply the half kneaded noodle skin raw material and the wrap off-cuts in the three-layer structure to the noodle skin forming unit in the next step.

The hopper is formed by the rectangular frame which has the rectangular shape having the anteroposterior length in the plan view with using the front plate, the rear plate, and a pair of two side plates, and is vertically open, and has below the front plate the passing hole for the half kneaded noodle skin raw material and the wrap off-cuts which are put on the feeding conveyor in the lower side within the hopper. Therefore, it is possible to efficiently supply the half kneaded noodle skin raw material and the wrap off-cuts which are input into the hopper to the noodle skin forming unit by the feeding conveyor.

The tray for inputting the half kneaded noodle skin raw material to the upper surface of the feeding conveyor in the lower side within the hopper is disposed in the upper portion of the side plate in front of the hopper. Therefore, it is possible to smoothly and securely replenish the noodle skin raw material by a simple operation with the reduction of the half kneaded noodle skin raw material supplied to the supply unit.

The upper surface of the tray is provided with the partition plate configured to input the half kneaded noodle skin raw material to the front side and the rear side of the feeding conveyor in the lower side within the hopper, Therefore, it is possible to input the half kneaded noodle skin raw material from the upper surface of the tray to the upper surface front portion side of the feeding conveyor in the front side within the hopper and the upper surface rear portion side of the feeding conveyor in the rear side within the hopper via the partition plate in a separated manner. Thus, it is possible to efficiently and securely supply the half kneaded noodle skin raw material and the wrap off-cuts to the noodle skin forming unit in the next step within the supply unit.

The noodle skin forming unit in front of the supply unit is provided with the rolling machine fixed to the shaft in which the rotating disc axially supporting a plurality of beat rollers so as to be rotatable on the same circumference is pivotally attached to the support frame. Therefore, it is possible to easily form the noodle skin for the gyoza skin having the three-layer structure in a short time on the basis of the beating motion of the plurality of beat rollers.

The needle skin forming unit in front of the supply unit is provided with the rolling machine fixed to the shaft in which the pipe roller is pivotally attached to the support frame rotatably. Therefore, it is possible to easily form the noodle skin for the gyoza skin having the three-layer structure in a short time on the basis of the rolling motion of the pipe roller.

The stepped pressing plate is axially supported to be swingable in front of the rolling machine. Therefore, it is possible to smoothly introduce the noodle skin for the gyoza skin having the thick three-layer structure to the rolling machine on the basis of the pressing force of the stepped pressing plate.

BRIEF DESCRIPTION OF DRAWINGS

FIGS. 12A to 12C are cross sectional views for describing formation of a gyoza by a forming die, in which FIG. 12A shows an open state of the forming die on which the gyoza skin and a filling are put, FIG. 12B shows a closed state of the forming die, and FIG. 12C shows a state in which the formed gyoza is pushed out.

DESCRIPTION OF EMBODIMENTS

A description will be given below specifically of an embodiment of a wrap off-cuts returning mechanism in a gyoza forming machine according to the present invention with reference to the accompanying drawings.

Figure 1:
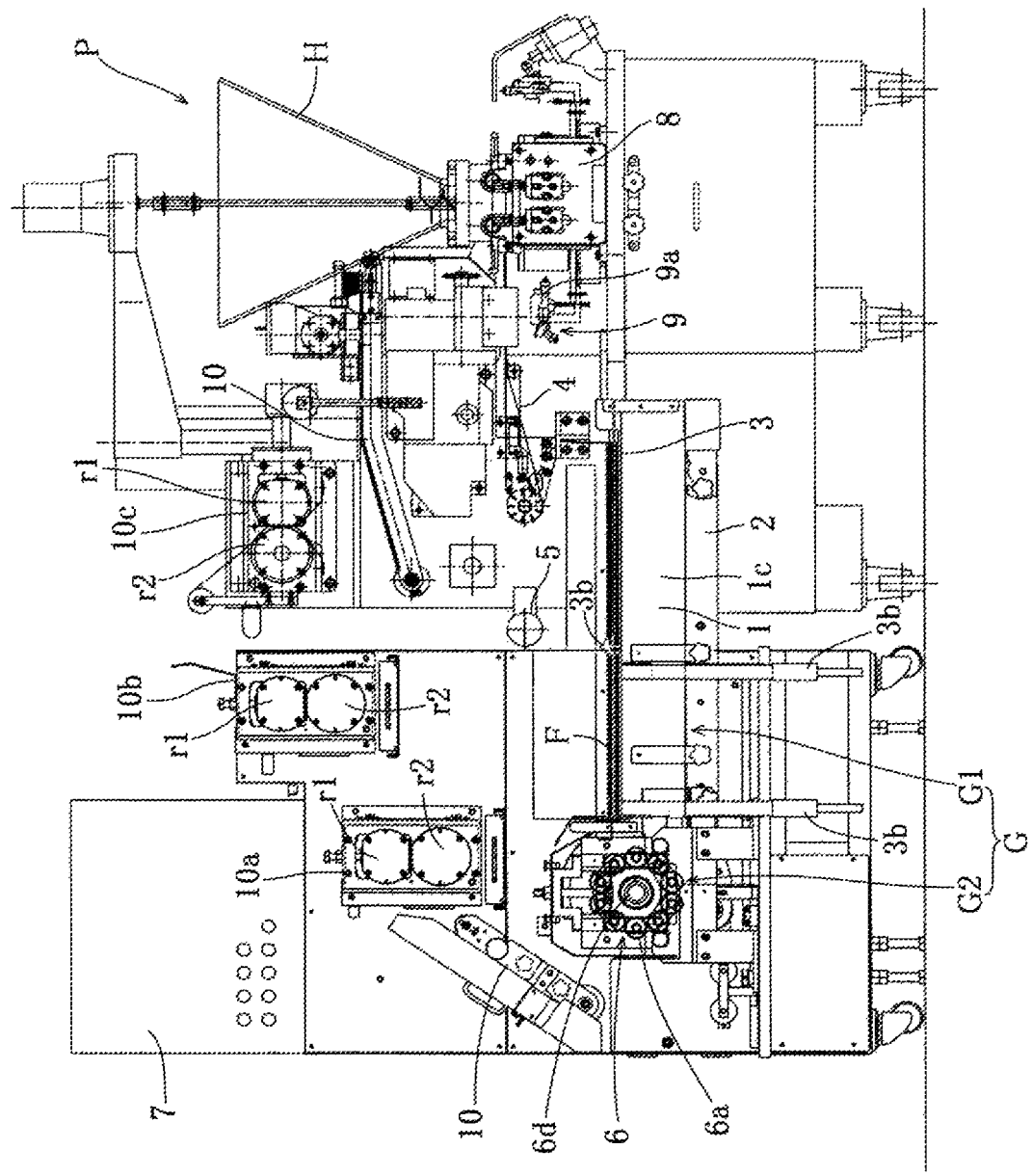
FIG. 1 is a front elevational view of a gyoza forming machine and shows an embodiment for carrying out the present invention.
Figure 2:
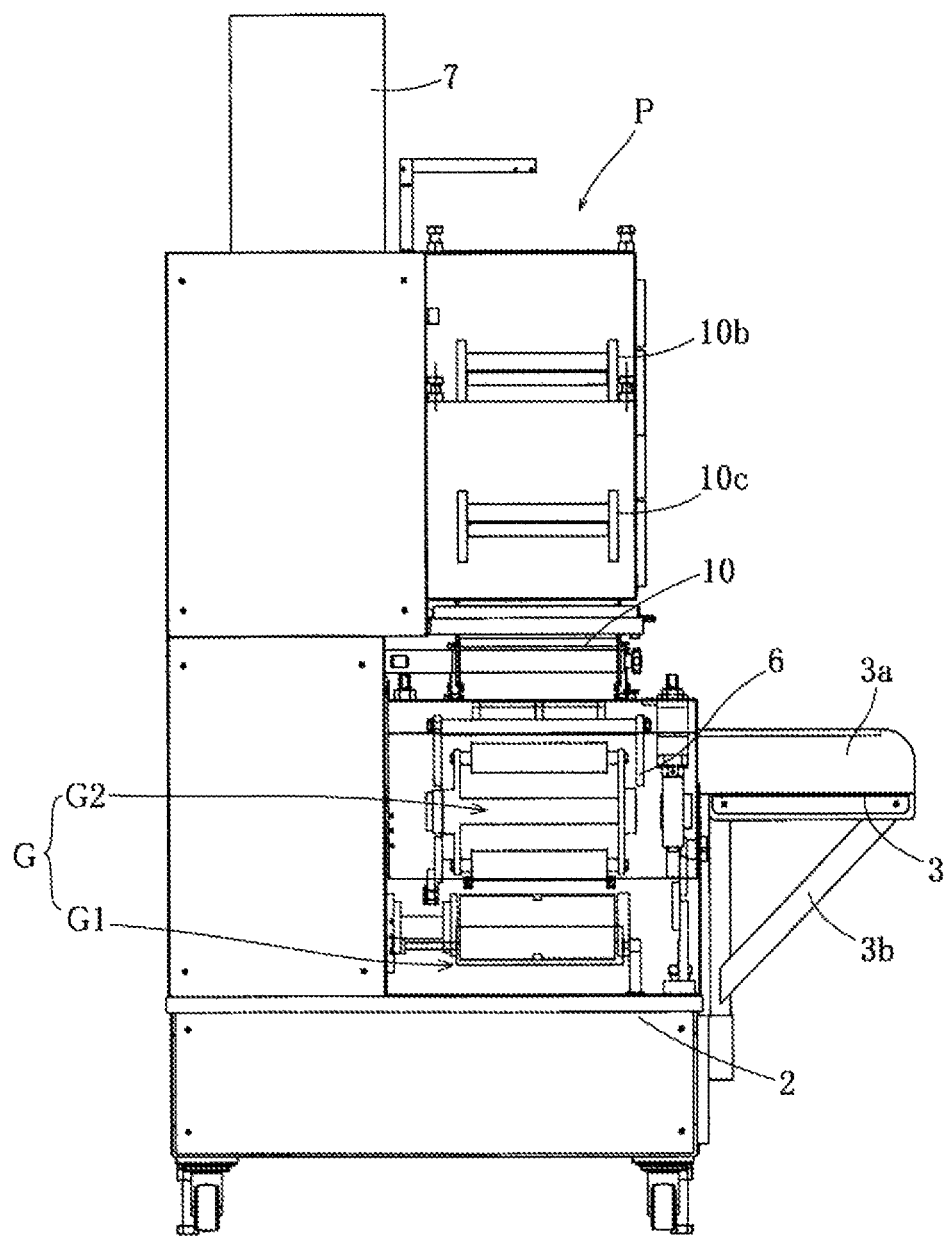
FIG. 2 is a side elevational view of the gyoza forming machine.

A gyoza forming machine P in the present embodiment is provided for forming a belt-like noodle skin W by compressing a half kneaded noodle skin raw material F, forming a gyoza skin M by die cutting the obtained belt-like noodle skin W into a predetermined shape, putting a gyoza filling g from a hopper H for filling material on the gyoza skin M, and obtaining a gyoza by wrapping the gyoza filling g with the gyoza skin M, as shown in FIGS. 1 and 2.

In the meantime, the gyoza forming machine P is provided with a wrap off-cuts returning mechanism G for reusing a wrap off-cuts N remaining after die cutting the belt-like noodle skin W, in order to continuously make a plurality of gyozas.

The wrap off-cuts returning mechanism G is mainly constructed by a supply unit G1 which supplies a wrap off-cuts N and a half kneaded raw material F in such a manner that the half kneaded noodle skin raw material F is disposed on both surfaces of the wrap off-cuts N after being die cut, and a noodle skin forming unit G2 which compresses the wrap off-cuts N and the noodle skin raw material F supplied from the supply unit G1 to form a noodle skin W having a three-layer structure.

The supply unit G1 is provided with a hopper 1 which inputs the wrap off-cuts N and the half kneaded noodle skin raw material F, and a feeding conveyor 2 which feeds the wrap off-cuts N and the half kneaded noodle skin raw material F to the needle skin forming unit G2 in the next step in a lower side of the hopper 1.

Figure 5:
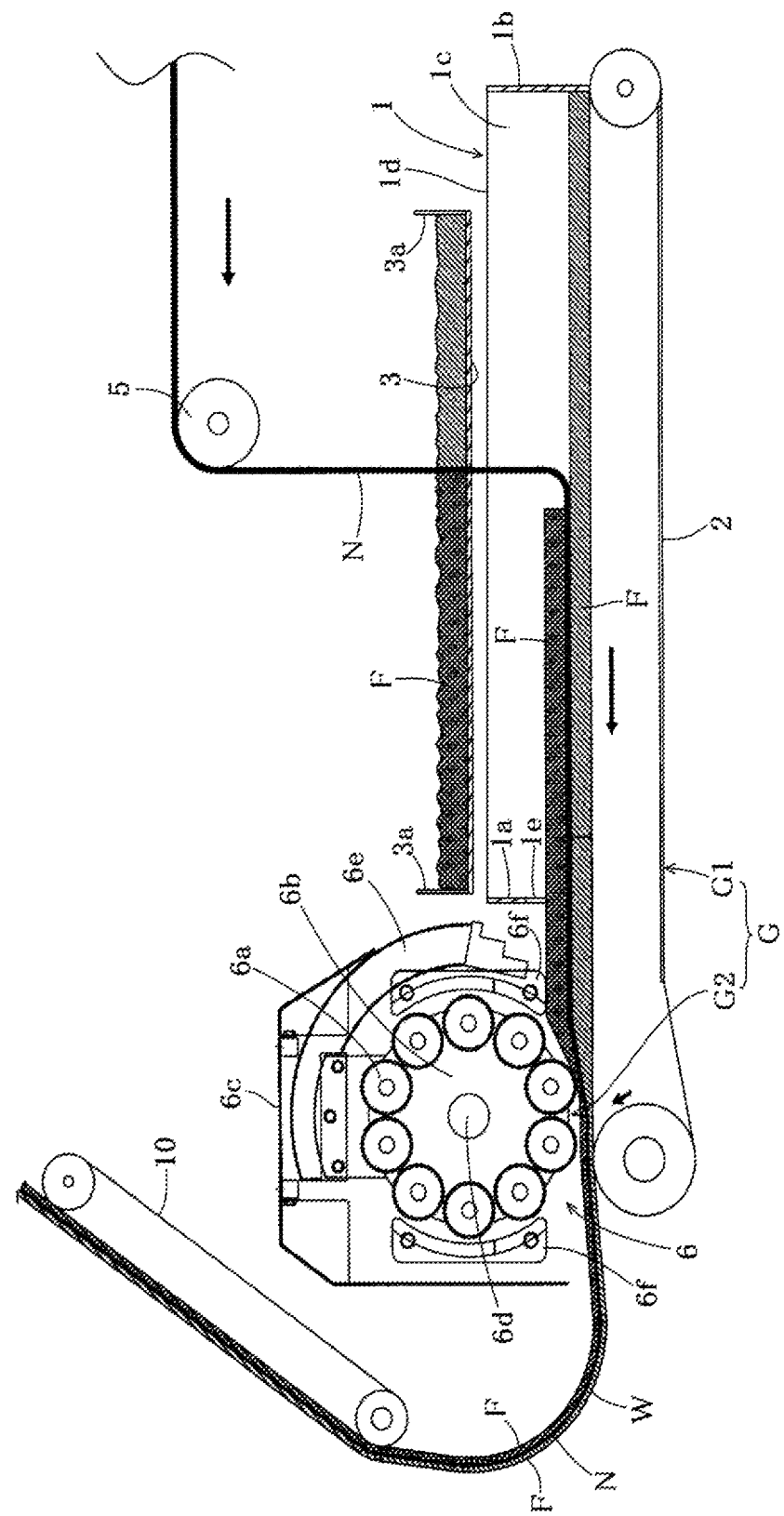
FIG. 5 is an explanatory view showing details of a wrap off-cuts returning mechanism in the gyoza forming machine in which a supply unit for the wrap off-cuts and a half kneaded noodle skin raw material and a noodle skin forming unit are enlarged.

Describing in detail, the supply unit G1 is provided with the hopper 1 and the feeding conveyor 2 in such a manner as to supply the half kneaded noodle skin raw material F to an upper surface of the feeding conveyor 2 in a front side within the hopper 1, thereafter supply the wrap off-cuts N so as to be positioned in an upper side of the half kneaded noodle skin raw material F, and supply the half kneaded noodle skin raw material F to a lower side of the wrap off-cuts N in the upper surface of the feeding conveyor 2 in a rear side within the hopper 1, as shown in FIG. 5.

The hopper 1 is formed by a rectangular frame 1d which has a rectangular shape having an anteroposterior length (being longer in a direction of rotation of the feeding conveyor 2) in a plan view with using a front plate 1a, a rear plate 1b and a pair of two side plates 1c and 1c, and is vertically open, and has below the front plate 1a a passing hole 1e for the half kneaded noodle skin raw material F and the wrap off-cuts N which are put on the feeding conveyor 2 in the lower side within the hopper 1.

Figure 3:
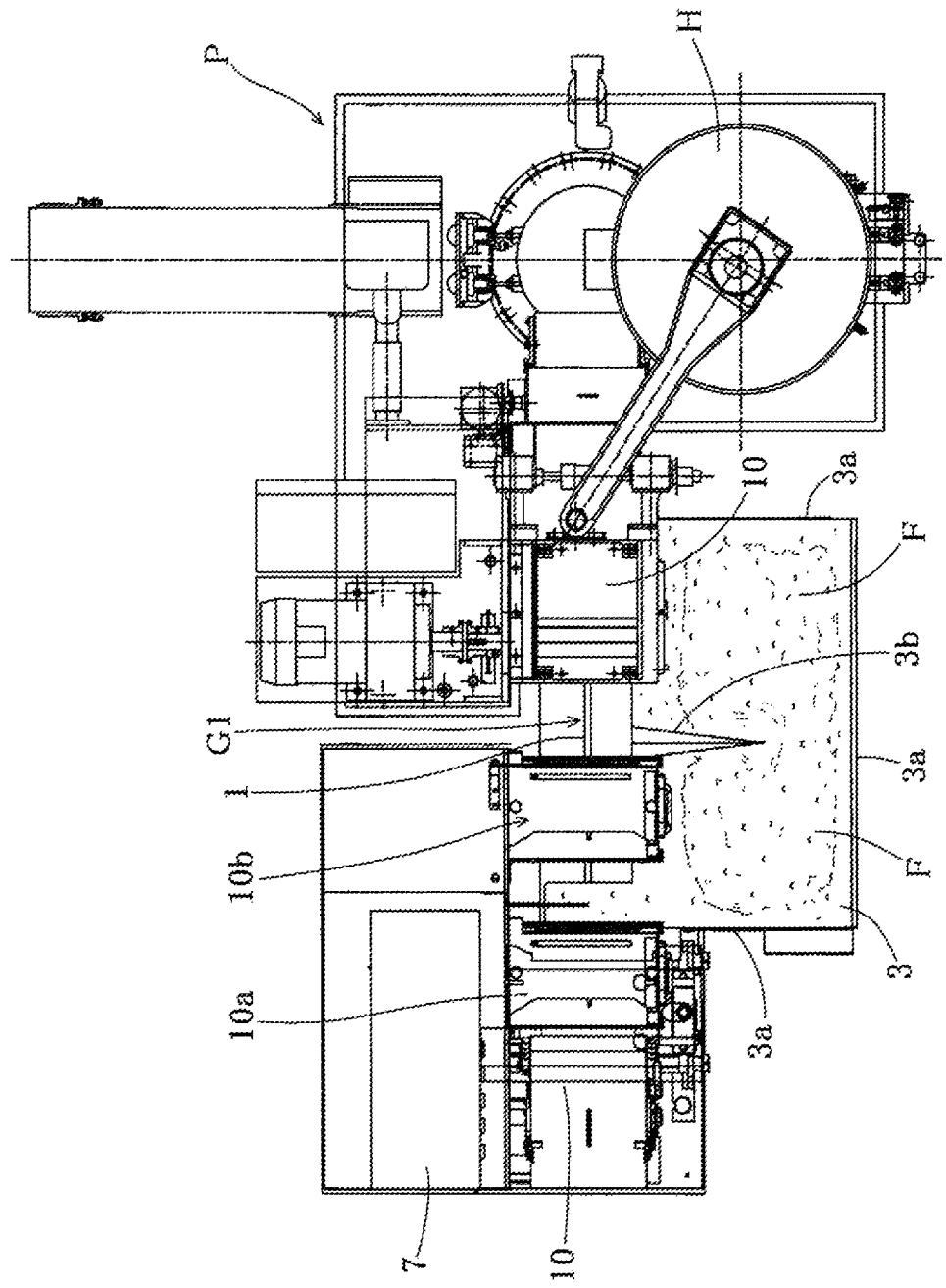
FIG. 3 is a top elevational view of the gyoza forming machine.
Figure 4:
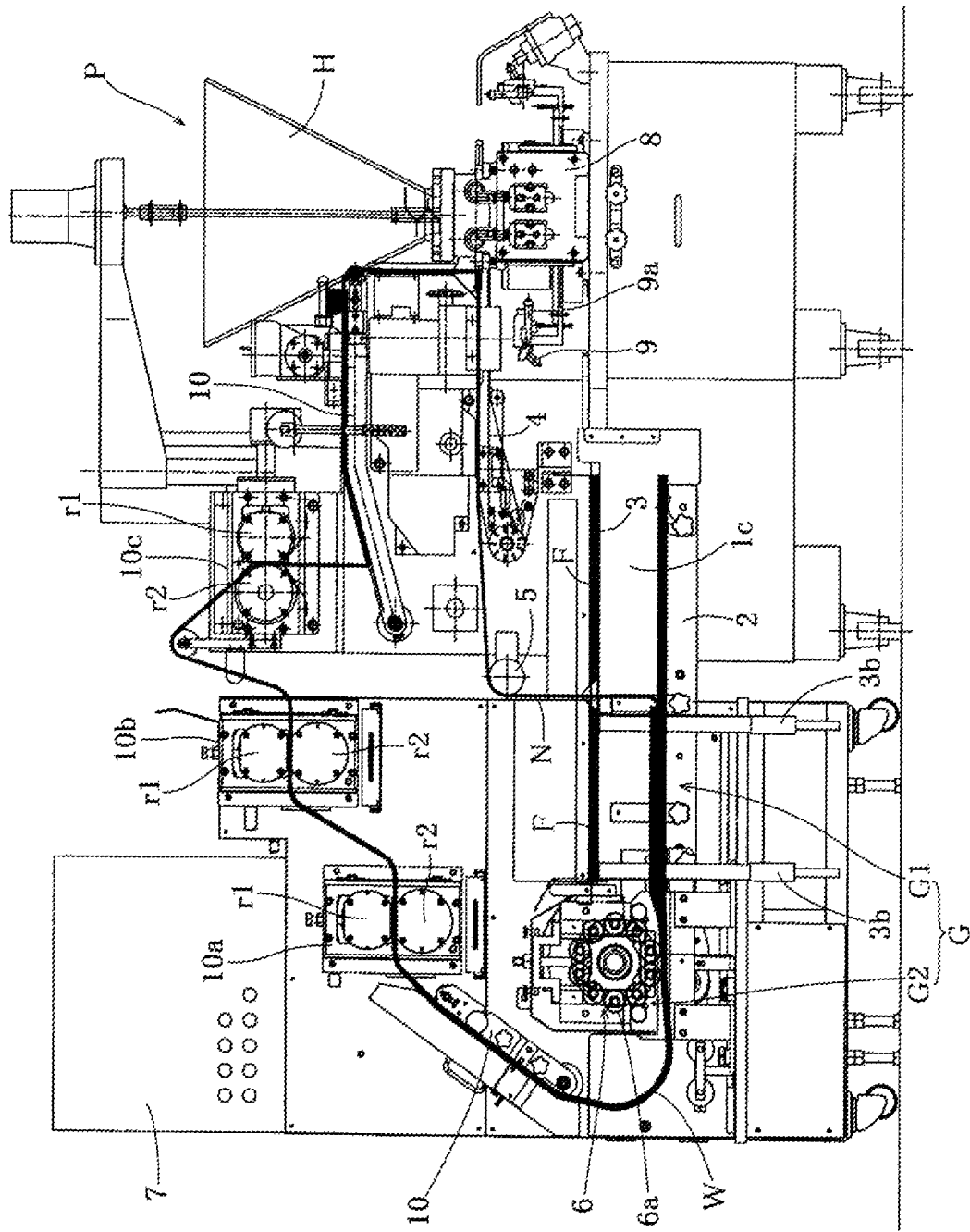
FIG. 4 is a front elevational view showing details of a feeding route of a gyoza skin in the gyoza forming machine.
Figure 6:
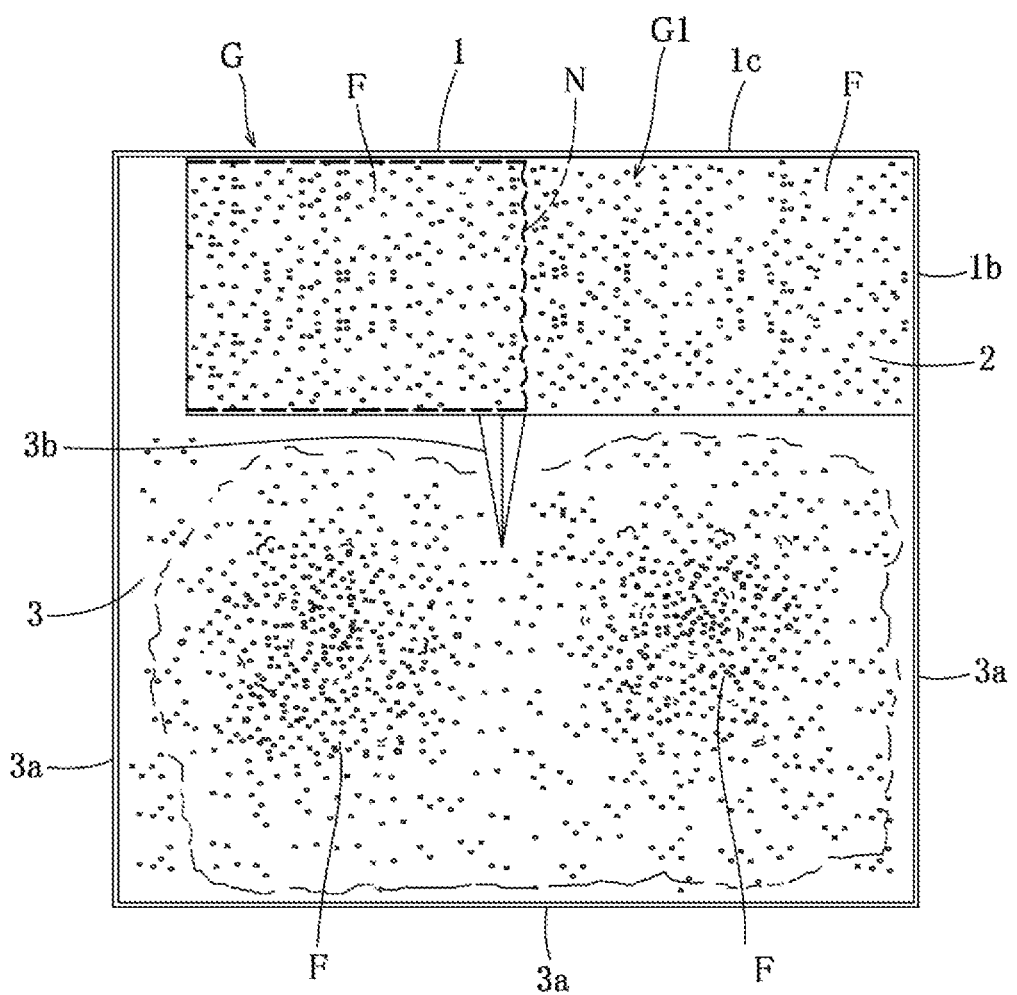
FIG. 6 is an explanatory view showing a used state of a tray in the wrap off-cuts returning mechanism.

An upper portion of the side plate 1c in the near side of the hopper 1 is provided with a tray 3 which inputs the half kneaded noodle skin raw material F to the upper surface of the feeding conveyor 2 in the lower side within the hopper 1 as shown in FIGS. 3, 5 and 6. The noodle skin raw material F is formed into a half kneaded state by mixing and kneading flour and water.

The tray 3 is provided with an end plate 3a in a standing manner in an edge portion except a front end in an inputting direction, and is provided with a partition plate 3b in a front end center portion in such a manner that the half kneaded noodle skin raw material F on the tray 3 is input to a front side and a rear side of the feeding conveyor 2 in the lower side within the hopper 1. Reference sign 3c in the drawing denotes a support leg which is installed in a lower side of the tray 3. The support leg 3c is attached to a front surface portion of the gyoza forming machine P. However, a lower end of the support leg 3c may be installed on a floor surface on which the gyoza forming machine P is placed, and the tray 3 may be formed to be detachable from the gyoza forming machine P. The present embodiment is configured to put the half kneaded noodle skin raw material F on the upper surface of the tray 3 and manually input the raw material F to the supply unit G1. However, the structure may be configured to automatically input the raw material F. Further, the half kneaded noodle skin raw material F may be input to the supply unit G1 by an automatic machine without using any tray 3.

Figure 7:
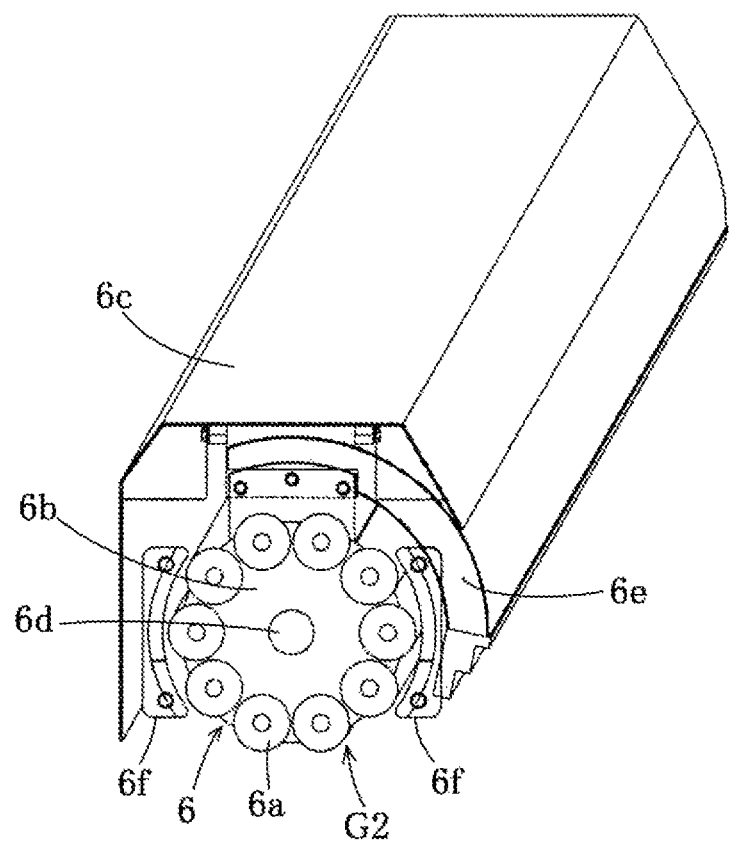
FIG. 7 is a perspective view showing the noodle skin forming unit of the wrap off-cuts returning mechanism.

In the meantime, the noodle skin forming unit G2 is disposed in front of the supply unit G1 as shown in FIGS. 5 and 7, and is configured to compress all the materials including the half kneaded noodle skin raw material F which is input to the upper surface of the feeding conveyor 2 within the hopper 1 from the laterally arranged tray 3, the die cut wrap off-cuts N input from a tension roller 5 via a noodle skin carry-in unit 4 of the gyoza forming machine P, and the half kneaded noodle skin raw material F input thereon and form them into a belt-like noodle skin W having a three-layer structure. The noodle skin forming unit G2 is provided with a rolling machine 6 formed by fixing a rotating disc 6b to a shaft 6d, the rotating disc 6b axially supporting a plurality of bead rollers 6a to be coaxially rotatable, and the shaft 6d being pivotally attached to the support frame 6c. A stepped pressing plate Se in the near side of the beat roller 6a is axially supported to the rolling machine 6 via the shaft 6d to be swingable.

Here, reference sign 6f in the drawing denotes two circular arc shaped partition member for preventing the raw material supplied from the supply unit G1 from entering around the beat roller 6a to cause any trouble in rotation.

More specifically, the pressing plate 6e is configured to swing around the shaft 6d of the rotating disc 6b, and press a dough on the feeding conveyor 2 step by step by two stages of lower end surfaces thereof before making a transition to the rolling machine 6.

The plurality of beat rollers 6a are axially supported to the same circumference of the rotating disc 6b to be rotatable, and the beat roller 6a is configured to revolve with the rotation of the rotating disc 6b and compress the half kneaded noodle skin raw material F supplied from the supply unit G1 below the rotating disc 6b so as to bite, thereby forming into the noodle skin W having the three-layer structure.

Figure 8:
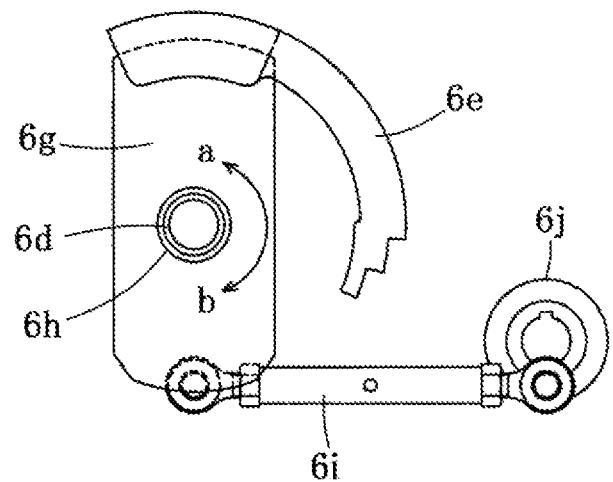
FIG. 8 is a front elevational view showing a pressing plate of the noodle skin forming unit.
Figure 9:
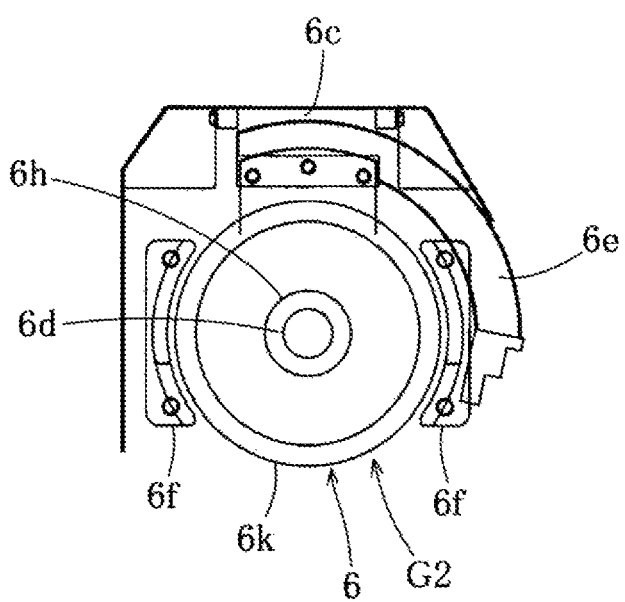
FIG. 9 is a front elevational view showing the other example of the noodle skin forming unit.

A swing unit 6g to which one end of the pressing plate 6e is fixed is axially supported to a shaft 6d protruding to an outer side of the support frame 6c to be swingable between a position a and a position b in the drawing via a bearing 6h with the pressing plate 6e, as shown in FIG. 8, A crank arm 6i is rotatably coupled to the other end of the swing unit 6g, and the other end of the crank arm 6i is rotatably coupled to a reciprocating mechanism, for example, an eccentric portion of a crank disc 6j.

In the meantime, according to the other example of the rolling machine 6, in place of the rolling machine 6 provided with a plurality of beat rollers 6a in the rotating disc 6b, a pipe roller 6k may be rotatably fixed to the shaft 6d which is pivotally attached to the support frame 6c.

In the drawing, reference numeral 7 denotes a control panel, reference numeral 8 denotes a die cutting unit for the noodle skin W, and reference numeral 9 denotes a gyoza forming unit, respectively.

Next, a description will be given of a using mode of a whole of the gyoza forming machine P and the wrap off-cuts returning mechanism G according to the present invention.

Figure 10A:
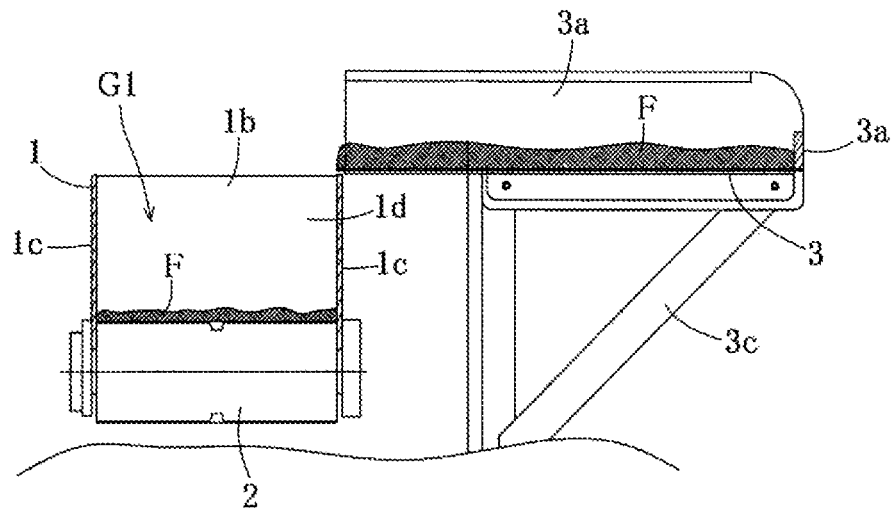
FIG. 10A is a cross sectional view showing a state in which the half kneaded noodle skin raw material in the tray is input onto a feeding conveyor below a hopper.
Figure 10B:
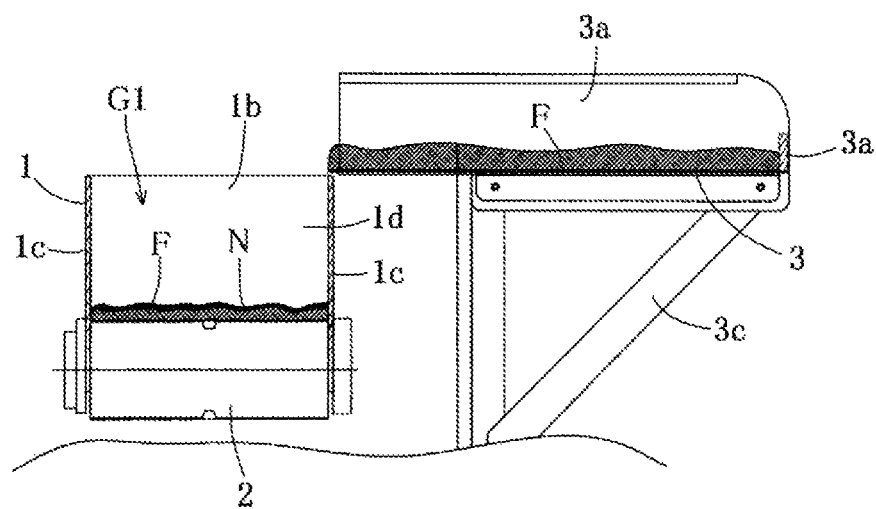
FIG. 10B is a cross sectional view showing a state in which the wrap off-cuts is input to an upper surface of the half kneaded noodle skin raw material on the feeding conveyor in a lower side within the hopper.
Figure 10C:
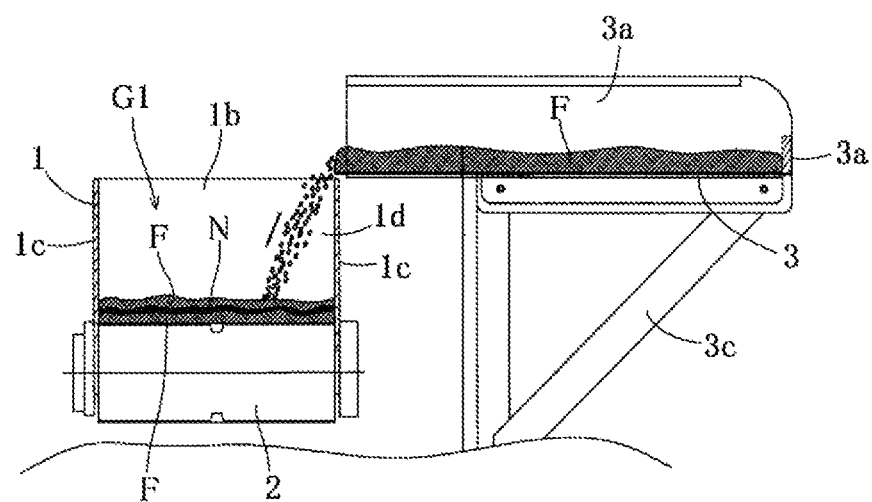
FIG. 10C is a cross sectional view showing a state in which the remaining half kneaded noodle skin raw material is input to the upper surface of the wrap off-cuts on the feeding conveyor in the lower side within the hopper.

First of all, the half kneaded noodle skin raw material F is input to an upper surface of the feeding conveyor 2 in the front portion side within the hopper 1 from the front side of the partition plate 3b of the tray 3 in the supply unit G1, as shown in FIG. 10A, and the wrap off-cuts N after being die cut is thereafter input thereon from the tension roller 5 via the noodle skin carry-in unit 4 of the gyoza forming machine P, as shown in FIG. 10B. Next, the half kneaded noodle skin raw material F is input to the upper surface of the feeding conveyor 2 in the rear portion side within the hopper 1 from the rear side of the partition plate 3b of the tray 3, and is put on the wrap off-cuts N after being die cut, as shown in FIG. 10C.

The rolling machine 6 forms the noodle skin W by feeding the supplied half kneaded noodle skin raw material F and wrap off-cuts N while compressing. Thus, the noodle skin W obtained by the noodle skin forming unit G2 is overlapped into the three-layer structure in the order of the half kneaded noodle skin raw material F, the wrap off-cuts N and the noodle skin raw material F in a thickness direction from below.

The feeding conveyor 2 is provided for continuously feeding the noodle skin W obtained by the noodle skin forming unit G2 to a position of the die cutting unit 8, and the feeding conveyors 10 and 10 for the noodle skin W and a plurality of (three in the present embodiment) rolling means (10a to 10c) are disposed between the noodle skin forming unit G2 ad the die cutting unit 8. The rolling means 10a to 10c can expand the noodle skin W at predetermined sizes. More specifically, a pair of rollers (r1 and r2) are disposed in each of the rolling means (10a to 10c) to be sequentially narrowed their distance, the noodle skin W is sequentially compressed in a thickness direction by passing a separation portion between the pair of rollers (r1 and r2), and the noodle skin W having the same thickness of the gyoza skin N having a predetermined thickness can be finally obtained.

Figure 11A:
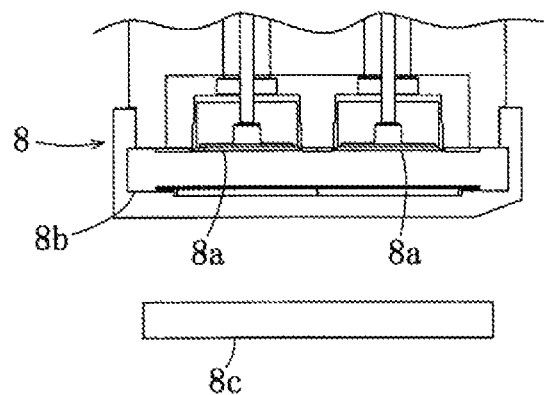
FIG. 11A is a schematic view showing a die cutter (before die cutting)
Figure 11B:
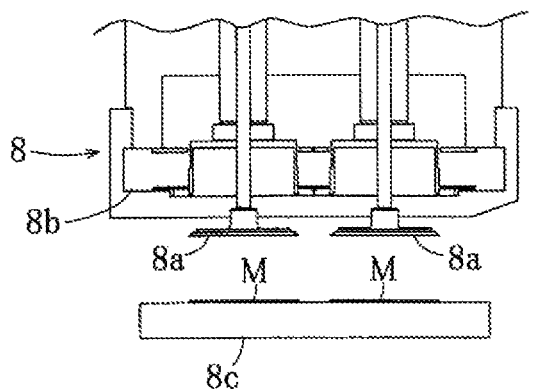
FIG. 11B is a schematic view showing the die cutter (after die cutting)
Figure 11C:
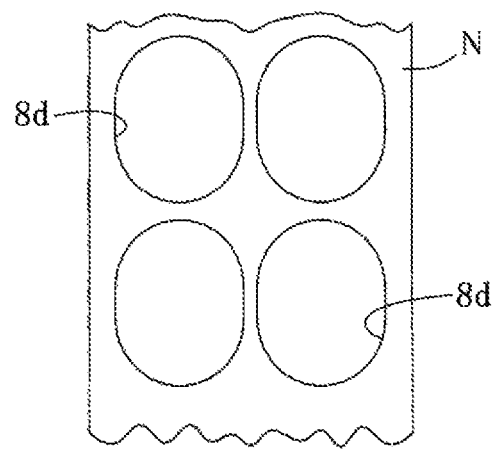
FIG. 11C is a plan view showing the wrap off-cuts after die cutting.

The die cutting unit 8 is configured to die cut the noodle skin W obtained by the noodle skin forming unit G2 into a predetermined shape (for example, a round shape) to form the gyoza skin M, and is in the present embodiment constructed by two vertically movable punching die 8a, two fixed dies 8b and a pedestal 8c disposed below the fixed dies, as shown in FIGS. 11A and 11B. More specifically, by die cutting the punching dies 8a to the fixed dies 8b in a state in which the fed noodle skin W is mounted on the fixed dies 8b as shown in FIGS. 11A and 11B, the fed needle skin W can be die cut into an approximately round hole 8d corresponding to a shape of the gyoza skin M, as shown in FIG. 11C.

Figure 12A:
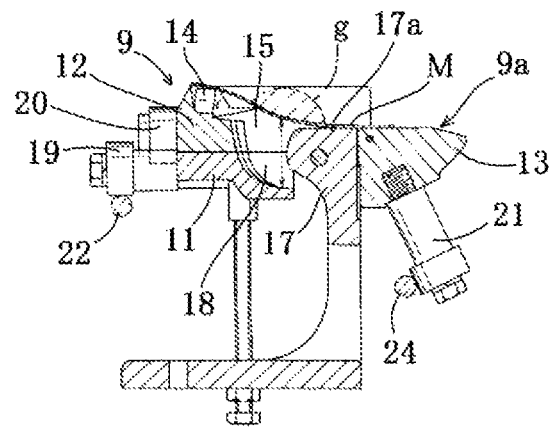

Further, the gyoza forming unit 9 provided in the gyoza forming machine P puts the gyoza filling g on the gyoza skin M obtained by the die cutting unit 8, and is provided with the forming die 9a for wrapping the gyoza filling g with the gyoza skin M to obtain the gyoza. Further, the forming die 9a sets a receiving die 11, an intermediate die 12 and a pressing die 13 to an open state, puts the gyoza skin M on a forming concave portion 18 over a projection 14 of the intermediate die 12, an outer edge upper surface 16 of a through hole 15, a receiving surface 17a of a base plate 17 and the receiving surface 17a of the pressing die 13, and thereafter fills a center portion of the gyoza skin M with the filling g by a hopper H for the filling in the gyoza forming machine P, as shown in FIG. 12A.

Figure 12B:
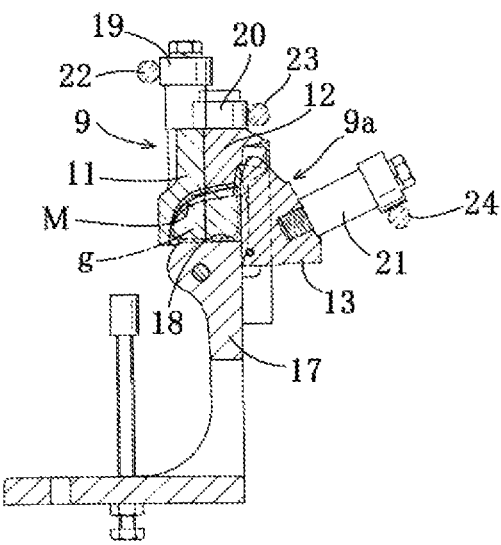

Next, as shown in FIG. 12B, the receiving die 11, the intermediate die 12 and the pressing die 13 are set to a closed state by sliding each of die opening guides 19, 20 and 21 along guide rails 22, 23 and 24, the gyoza skin M is folded in half in a state in which the filling g is internally included, and the gyoza is formed within the forming concave portion 18.

Figure 12C:
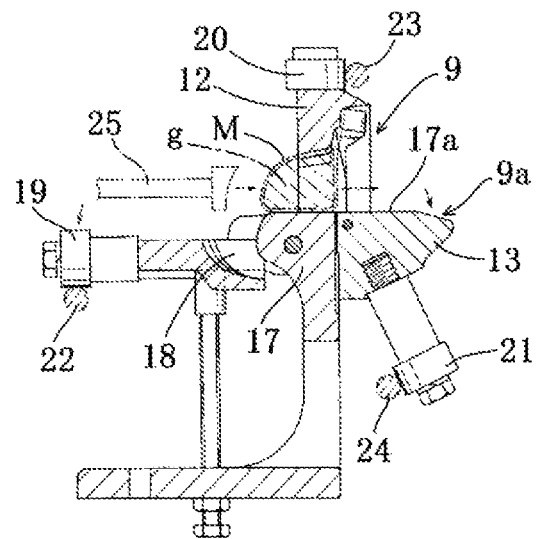

Finally, as shown in FIG. 12C, only the receiving die 11 and the pressing die 13 except the intermediate die 12 are opened to an original position, and the gyoza housed within the through hole 15 of the intermediate die 12 is pushed forward by a pressing tool 25. The gyoza pressed out as mentioned above is slid on the receiving surfaces 17a and 17a of the pressing die 13 and is discharged to a discharge table or a discharge conveyor.

Figure 13A:
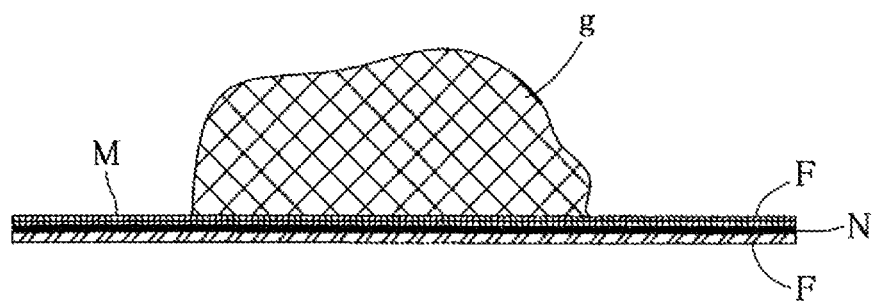
FIG. 13A is a cross sectional view showing a state in which the filling is put on the gyoza skin having a three-layer structure.
Figure 13B:
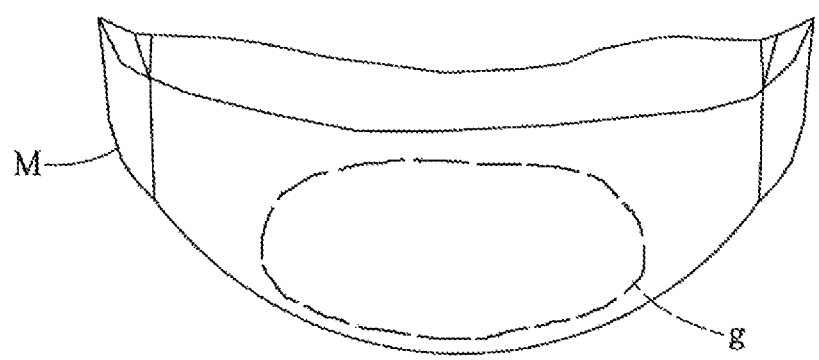
FIG. 13B is a perspective view showing a state in which the filling is rolled up by the gyoza skin having the three-layer structure.
Figure 13C:
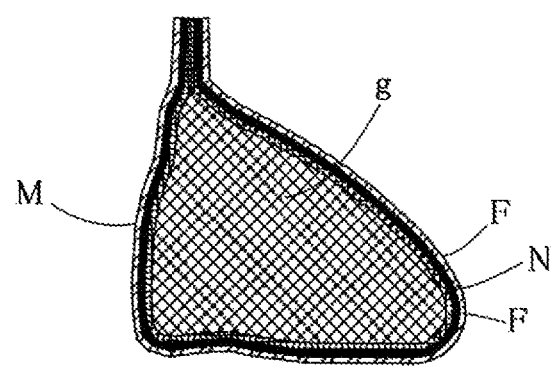
FIG. 13C is a cross sectional view showing an inner portion of the gyoza.

Thus, the gyoza skin M die cut by the die cutting unit 8 is put on in such a manner that a facing surface is formed as a first layer of the half kneaded noodle skin raw material F, an opposite surface is formed as a second layer made of the wrap off-cuts N, and an opposite surface to the second layer is formed as a third layer of the half kneaded noodle skin raw material F, in the structure shown in FIGS. 13A and 13B. Therefore, the gyoza forming unit 9 can obtain the gyoza by wrapping the gyoza filling g in a state in which the first layer is formed as an outer side of the gyoza skin M and the third layer is formed as an inner side of the gyoza skin M. More specifically, in the gyoza made by the present apparatus, the first layer is positioned outside the gyoza skin M and the inner side wrapping the gyoza filling g forms the third layer, as shown in FIG. 13C.

However, it goes without saying that the gyoza filling g can be wrapped by forming the first layer in the inner side of the gyoza skin M and forming the third layer in the outer side of the gyoza skin M.

The invention claimed is:

1. A wrap off-cuts returning mechanism in a gyoza forming machine compressing a half kneaded noodle skin raw material to form into a belt-like shape, die cutting the obtained belt-like material into a predetermined shape to form a gyoza skin, putting a gyoza filling on the gyoza skin, and wrapping the gyoza filling with the gyoza skin to obtain a gyoza, comprising:

a supply unit for a wrap off-cuts and the half kneaded noodle skin raw material which arranges the half kneaded noodle skin raw material on both surfaces of the wrap off-cuts after being die cut; and a noodle skin forming unit which compresses the wrap off-cuts and the needle skin raw material supplied from the supply unit to form a three-layer structure noodle skin, and wherein the wrap off-cuts returning mechanism is configured to return the die cut wrap off-cuts formed by the noodle skin forming unit to the supply unit.

2. The wrap off-cuts returning mechanism in the gyoza forming machine according to claim 1, wherein the supply unit comprises a hopper which inputs the half kneaded noodle skin raw material, and a feeding conveyor which feeds the noodle skin raw material and the wrap off-cuts to the noodle skin forming unit below the hopper.

3. The wrap off-cuts returning mechanism in the gyoza forming machine according to claim 2, wherein the supply unit comprises a hopper and a feeding conveyor which are configured to supply the half kneaded noodle skin raw material to an upper surface of the feeding conveyor in a front side within the hopper, thereafter supply the wrap off-cuts so as to position in an upper side of the half kneaded noodle skin raw material, and supply the half kneaded noodle skin raw material to a lower side of the wrap off-cuts in the upper surface of the feeding conveyor in a rear side within the hopper.

4. The wrap off-cuts returning mechanism in the gyoza forming machine according to claim 3, wherein a tray for inputting the half kneaded noodle skin raw material to an upper surface of the feeding conveyor in the lower side within the hopper is disposed in an upper portion of a side plate in front of the hopper.

5. The wrap off-cuts returning mechanism in the gyoza forming machine according to claim 4, wherein an upper surface of the tray is provided with a partition plate configured to input the half kneaded noodle skin raw material to a front side and a rear side of the feeding conveyor in the lower side within the hopper.

6. The wrap off-cuts returning mechanism in the gyoza forming machine according to claim 2, wherein the hopper is formed by a rectangular frame which has a rectangular shape having an anteroposterior length in a plan view with using a front plate, a rear plate and a pair of two side plates, and is vertically open, and has below the front plate a passing hole for the half kneaded noodle skin raw material and the wrap off-cuts which are put on the feeding conveyor in the lower side within the hopper.

7. The wrap off-cuts returning mechanism in the gyoza forming machine according to claim 6, wherein a tray for inputting the half kneaded noodle skin raw material to an upper surface of the feeding conveyor in the lower side within the hopper is disposed in an upper portion of a side plate in front of the hopper.

8. The wrap off-cuts returning mechanism in the gyoza forming machine according to claim 7, wherein an upper surface of the tray is provided with a partition plate configured to input the half kneaded noodle skin raw material to a front side and a rear side of the feeding conveyor in the lower side within the hopper.

9. The wrap off-cuts returning mechanism in the gyoza forming machine according to claim 2, wherein a tray for inputting the half kneaded noodle skin raw material to an upper surface of the feeding conveyor in the lower side within the hopper is disposed in an upper portion of a side plate in front of the hopper.

10. The wrap off-cuts returning mechanism in the gyoza forming machine according to claim 9, wherein an upper surface of the tray is provided with a partition plate configured to input the half kneaded noodle skin raw material to a front side and a rear side of the feeding conveyor in the lower side within the hopper.

11. The wrap off-cuts returning mechanism in the gyoza forming machine according to claim 2, wherein the noodle skin forming unit in front of the supply unit is formed by a rolling machine fixed to a shaft in which a rotating disc axially supporting a plurality of beat rollers so as to be rotatable on the same circumference is pivotally attached to a support frame.

12. The wrap off-cuts returning mechanism in the gyoza forming machine according to claim 11, wherein a stepped pressing plate is axially supported to be swingable in front of the rolling machine.

13. The wrap off-cuts returning mechanism in the gyoza forming machine according to claim 2, wherein the needle skin forming unit in front of the supply unit is formed by a rolling machine fixed to a shaft in which a pipe roller is pivotally attached to a support frame rotatably.

14. The wrap off-cuts returning mechanism in the gyoza forming machine according to claim 13, wherein a stepped pressing plate is axially supported to be swingable in front of the rolling machine.

15. The wrap off-cuts returning mechanism in the gyoza forming machine according to claim 1, wherein the supply unit comprises a hopper and a feeding conveyor which are configured to supply the half kneaded noodle skin raw material to an upper surface of the feeding conveyor in a front side within the hopper, thereafter supply the wrap off-cuts so as to position in an upper side of the half kneaded noodle skin raw material, and supply the half kneaded noodle skin raw material to a lower side of the wrap off-cuts in the upper surface of the feeding conveyor in a rear side within the hopper.

16. The wrap off-cuts returning mechanism in the gyoza forming machine according to claim 15, wherein the hopper is formed by a rectangular frame which has a rectangular shape having an anteroposterior length in a plan view with using a front plate, a rear plate and a pair of two side plates, and is vertically open, and has below the front plate a passing hole for the half kneaded noodle skin raw material and the wrap off-cuts which are put on the feeding conveyor in the lower side within the hopper.

17. The wrap off-cuts returning mechanism in the gyoza forming machine according to claim 16, wherein a tray for inputting the half kneaded noodle skin raw material to an upper surface of the feeding conveyor in the lower side within the hopper is disposed in an upper portion of a side plate in front of the hopper.

18. The wrap off-cuts returning mechanism in the gyoza forming machine according to claim 15, wherein a tray for inputting the half kneaded noodle skin raw material to an upper surface of the feeding conveyor in the lower side within the hopper is disposed in an upper portion of a side plate in front of the hopper.

19. The wrap off-cuts returning mechanism in the gyoza forming machine according to claim 18, wherein an upper surface of the tray is provided with a partition plate configured to input the half kneaded noodle skin raw material to a front side and a rear side of the feeding conveyor in the lower side within the hopper.

20. The wrap off-cuts returning mechanism in the gyoza forming machine according to claim 15, wherein the noodle skin forming unit in front of the supply unit is formed by a rolling machine fixed to a shaft in which a rotating disc axially supporting a plurality of beat rollers so as to be rotatable on the same circumference is pivotally attached to a support frame.

21. The wrap off-cuts returning mechanism in the gyoza forming machine according to claim 20, wherein a stepped pressing plate is axially supported to be swingable in front of the rolling machine.

22. The wrap off-cuts returning mechanism in the gyoza forming machine according to claim 15, wherein the needle skin forming unit in front of the supply unit is formed by a rolling machine fixed to a shaft in which a pipe roller is pivotally attached to a support frame rotatably.

23. The wrap off-cuts returning mechanism in the gyoza forming machine according to claim 22, wherein a stepped pressing plate is axially supported to be swingable in front of the rolling machine.

24. The wrap off-cuts returning mechanism in the gyoza forming machine according to claim 1, wherein the noodle skin forming unit in front of the supply unit is formed by a rolling machine fixed to a shaft in which a rotating disc axially supporting a plurality of beat rollers so as to be rotatable on the same circumference is pivotally attached to a support frame.

25. The wrap off-cuts returning mechanism in the gyoza forming machine according to claim 24, wherein a stepped pressing plate is axially supported to be swingable in front of the rolling machine.

26. The wrap off-cuts returning mechanism in the gyoza forming machine according to claim 1, wherein the needle skin forming unit in front of the supply unit is formed by a rolling machine fixed to a shaft in which a pipe roller is pivotally attached to a support frame rotatably.

27. The wrap off-cuts returning mechanism in the gyoza forming machine according to claim 26, wherein a stepped pressing plate is axially supported to be swingable in front of the rolling machine.

\* \* \* \* \*